United States Patent
Huh et al.

(10) Patent No.: US 9,995,974 B2
(45) Date of Patent: Jun. 12, 2018

(54) LIQUID CRYSTAL DISPLAY

(71) Applicant: Samsung Display Co., Ltd, Yongin, Gyeonggi-do (KR)

(72) Inventors: Soo Jeong Huh, Asan-si (KR); Yang Hee Kim, Incheon (KR); Sung In Ro, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 242 days.

(21) Appl. No.: 15/132,101

(22) Filed: Apr. 18, 2016

(65) Prior Publication Data

US 2016/0259216 A1 Sep. 8, 2016

Related U.S. Application Data

(63) Continuation of application No. 13/844,798, filed on Mar. 16, 2013, now Pat. No. 9,316,873.

(30) Foreign Application Priority Data

Aug. 31, 2012 (KR) ........................ 10-2012-0096595

(51) Int. Cl.
*G02F 1/1343* (2006.01)
*G02F 1/1337* (2006.01)
(Continued)

(52) U.S. Cl.
CPC .. *G02F 1/134309* (2013.01); *G02F 1/133345* (2013.01); *G02F 1/133707* (2013.01);
(Continued)

(58) Field of Classification Search
None
See application file for complete search history.

(56) References Cited

U.S. PATENT DOCUMENTS 6,809,789 B2   10/2004   Kim et al.
6,856,371 B2   2/2005    Kim et al.
(Continued)

FOREIGN PATENT DOCUMENTS

CN   102566176 A   7/2012
JP   2010-102286 A   5/2010
(Continued)

OTHER PUBLICATIONS

Samsung Display Co., Ltd.; Extended European search report; European Patent Application No. 13163488.3; dated Nov. 22, 2013; 9 pp.

(Continued)

*Primary Examiner* — Richard Kim
(74) *Attorney, Agent, or Firm* — Innovation Counsel LLP

(57) ABSTRACT

A liquid crystal display includes a first substrate, a gate line disposed on the first substrate and extending parallel to a major horizontal reference line of the display, and a plurality of pixel unit cells disposed on and tesslating a display area of the first substrate where each unit cell includes a first field generating electrode and a second field generating electrode with an insulating layer interposed therebetween, wherein a first one of the first and second field generating electrodes has a plurality of cutouts defined therein for producing corresponding liquid crystal domains, the plurality of cutouts each including a first inclined edge portion forming a first angle with the vertical reference line and a second inclined edge portion forming a second angle with the vertical reference line that is different from the first angle, wherein a ratio of a length of the first inclined edge portion to a length of the cutout is about 80% or more, and the density of the plurality of pixels is about 200 PPI or more.

20 Claims, 14 Drawing Sheets

(51) Int. Cl.
*G02F 1/1333* (2006.01)
*G02F 1/1362* (2006.01)

(52) U.S. Cl.
CPC .. *G02F 1/134363* (2013.01); *G02F 1/136286* (2013.01); *G02F 2001/134372* (2013.01); *G02F 2201/122* (2013.01); *G02F 2201/503* (2013.01)

(56) References Cited

U.S. PATENT DOCUMENTS

| | | | |
|---|---|---|---|
| 7,292,302 | B2 | 11/2007 | Min et al. |
| 7,952,669 | B2 | 5/2011 | Koma |
| 2009/0128726 | A1 | 5/2009 | Tanno |
| 2010/0079712 | A1 | 4/2010 | Tanaka et al. |
| 2010/0157228 | A1 | 6/2010 | Sakuri et al. |
| 2010/0296040 | A1 | 11/2010 | Han et al. |
| 2011/0216280 | A1 | 9/2011 | Itou |
| 2012/0008059 | A1 | 1/2012 | Kim et al. |
| 2012/0050630 | A1 | 3/2012 | Sato et al. |
| 2012/0127148 | A1 | 5/2012 | Lee et al. |
| 2012/0327338 | A1 | 12/2012 | Kobayashi |

FOREIGN PATENT DOCUMENTS

| | | |
|---|---|---|
| JP | 2010-128113 A | 6/2010 |
| JP | 2010-217635 | 9/2010 |
| JP | 2011-102816 A | 5/2011 |
| JP | 2013-007955 A1 | 1/2013 |
| KR | 10-2008-0002205 A | 1/2008 |
| KR | 10-2008-0082084 A | 9/2008 |
| KR | 10-2009-0036867 A | 4/2009 |
| KR | 10-2009-0116856 A | 11/2009 |
| KR | 10-2010-0114235 A | 10/2010 |

OTHER PUBLICATIONS

EP13163488 search report dated May 30, 2014, 8 pgs.

LIQUID CRYSTAL DISPLAY

CROSS-REFERENCE TO RELATED APPLICATION

This application is a continuation application of U.S. patent application Ser. No. 13/844,798 filed on Mar. 16, 2013, which claims priority to to and the benefit of Korean Patent Application No. 10-2012-0096595 filed in the Korean Intellectual Property Office on Aug. 31, 2012, the contents of the prior applications being herein incorporated by reference.

BACKGROUND (a) Field of Disclosure

The present disclosure of invention relates to a liquid crystal display, and more particularly, to a liquid crystal display having increased transmittance and reduced deterioration of a display quality.

(b) Description of Related Technology

The liquid crystal display (LCD) is currently one of the most widely used types of flat panel displays. Generally the LCD is a display device used for adjusting magnitude of a transmitted therethrough light by applying a voltage between electrodes so as to rearrange liquid crystal molecules of a liquid crystal layer and thus impart desired optical effects (e.g., modulated polarity) to the transmitted through light.

The liquid crystal display has a merit in that it is easy to form as striped or otherwise matrix like repeated groups of differently colored subpixels, but it has a drawback in that a lateral visibility of its image is lower than a frontal visibility. Accordingly, various methods of arranging and driving liquid crystal to have different domains have been developed to overcome the drawback. A liquid crystal display where a pixel electrode and a common electrode are formed on one substrate has received attention as a method of implementing a wide viewing angle.

In the liquid crystal display, at least one of two field generating electrodes of the pixel electrode and the common electrode has a plurality of cutouts for thereby defining different liquid crystal domains, and a plurality of branch electrodes defined by a plurality of cutouts.

Meanwhile, if a fluidic pressure wave is generated in one of the cutouts, for example due to impact applied from the outside of the liquid crystal display, the wave spreads easily along the channel of a straight cutout and a corresponding irregular behavior of liquid crystal molecules occurs where the irregular behavior of the liquid crystal molecules easily spreads along the entire length of the cutout of the field generating electrode. It is possible to prevent such easy spreading (propogation) of irregular pattern behavior of the liquid crystal molecules by variously forming angles in pattern of the cutouts (e.g., as measured relative to a vertical standard line). However, an aperture size of each pixel area of the liquid crystal display may be reduced due to introduction of such angles and; as a resolution of the liquid crystal display is increased by decreasing the sizes of all pixel areas, a corresponding aperture transmittance factor of the liquid crystal display is deteriorated by such forming of the angle between the cutout and the vertical standard line where data lines and gate lines of the device extend according to straight lines and switching elements (TFTs) are disposed in corner portions of such pixel unit cell structures.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a liquid crystal display capable of having a high resolution (e.g., 200 or more pixel areas per inch) in which the basic repeat pattern of pixel electrodes, common electrode and switching element is structured as bounded by two identical parallelograms, one flipped vertically and stacked with its base directly on top of the roof of its twin and then a rectangle with a same width as the base stacked directly under or on top of the two parallelograms, where the switching element is substantially contained in the rectangle. This forms a repeated unit cell and then angles of inclined straight edges within cutout areas of the unit cell are adjusted so as to simultaneously provide for reduced degradation to image quality due to external pressure shocks and increased transmittance of backlighting light through the respective unit cells.

In one embodiment, two field generating electrodes are formed on a same one substrate and at least one of the two field generating electrodes is patterned to have a multiple-bent cutout, such that the multiple bends along the fluid flow directing channel of the cutout prevent direct propagation of fluid pressure waves linearly along the full length of the cutout and thus irregular behaviors of liquid crystal molecules according to external pressures are inhibited from easily moving along the entire cutout. The basic two parallelograms plus rectangle shape and specific bend angles of the cutouts also help to prevent deterioration of a backlighting transmittance efficiency of the liquid crystal display.

An exemplary embodiment provides a liquid crystal display including: a first substrate, a gate line disposed on the first substrate and substantially extending parallel to a horizontal reference line (X axis), and a plurality of repeated pixel unit cells disposed on the first substrate and each including a first field generating electrode and a second field generating electrode with an insulating layer interposed therebetween, wherein one of the first and second field generating electrodes has a plurality of cutouts, where the plurality of cutouts each includes a first inclined edge portion forming a first angle with a vertical reference line (Y axis), the latter forming an angle of 90° with the horizontal reference line (X axis) of the gate line and where each cutout further includes a second inclined edge portion forming a second angle with the vertical reference line (Y axis) that is different from the first angle, where a ratio of a vertical length of the first inclined edge portion to a vertical length of the cutout is about 80% or more but less than 100%, and density of the plurality of pixels is about 200 PPI (pixels per inch) or more. Here, the vertical length is measured along the vertical reference line (Y axis).

A ratio of a vertical length of the second inclined edge portion to the vertical length of the cutout may be about 6% to about 13%.

The second angle may be larger than the first angle.

The cutout may further include a third inclined edge portion forming a third angle with the vertical reference line (Y axis) that is different from the first angle, and a ratio of a vertical length of the third inclined edge portion to the vertical length of the cutout may be about 10% or less.

The third angle may be larger than the first angle.

A value obtained by multiplying a sum of the ratio of the vertical length of the second inclined edge portion to the vertical length of the cutout and the ratio of the vertical length of the third inclined edge portion to the vertical length of the cutout by a vertical length of the pixel may be about 20 μm or less.

A value obtained by multiplying the ratio of the vertical length of the second inclined edge portion to the vertical length of the cutout or the ratio of the vertical length of the third inclined edge portion to the vertical length of the cutout by the vertical length of the pixel is about 5 μm or less.

The horizontal length of the pixel unit cell may be about 40 μm or less and a vertical length thereof may be about 120 μm or less.

The other one of the first and second field generating electrodes may have a plate shape such that it has essentially no cutouts for producing different liquid crystal domains.

Another exemplary embodiment provides a liquid crystal display including: a first substrate, a gate line disposed on the first substrate, and a plurality of pixel unit cells disposed on the first substrate and each including a first field generating electrode and a second field generating electrode overlapping with an insulating layer interposed therebetween, wherein a first one of the first and second field generating electrodes has a plurality of cutouts, each of the plural cutouts includes a first inclined straight edge portion forming a first angle with a vertical reference line, the latter forming an angle of 90° with a corresponding horizontal reference line to which the gate line generally extends parallel to, a second inclined straight edge portion forming a second angle with the vertical reference line that is larger than the first angle, and a third inclined straight edge portion forming a third angle with the vertical reference line that is larger than the first angle, and where a value obtained by multiplying a sum of a ratio of a vertical length of the second inclined straight edge portion to a vertical length of the cutout and a ratio of a vertical length of the third inclined straight edge portion to the vertical length of the cutout by a vertical length of the pixel is about 20 μm or less.

The density of the plurality of pixels may be about 200 PPI or more.

Yet another exemplary embodiment provides a liquid crystal display including: a first substrate, a gate line disposed on the first substrate, and, a plurality of pixels disposed on the first substrate and including a first field generating electrode and a second field generating electrode with an insulating layer interposed therebetween, wherein a first one of the first and second field generating electrodes has a plurality of cutouts, the plurality of cutouts each including a first inclined edge portion forming a first angle with a vertical reference line, the latter forming an angle of 90° with the gate line, a second inclined edge portion forming a second angle with the vertical reference line that is larger than the first angle, and a third portion forming a third inclined edge angle with the vertical reference line that is larger than the first angle, and where a value obtained by multiplying a ratio of a vertical length of the second inclined edge portion to a vertical length of the cutout or a ratio of a vertical length of the third inclined edge portion to the vertical length of the cutout by a vertical length of the pixel is about 5 μm or less.

Still another exemplary embodiment provides a liquid crystal display including: a first substrate, a gate line disposed on the first substrate, and a plurality of pixels disposed on the first substrate and each including a first field generating electrode and a second field generating electrode overlapping with an insulating layer interposed therebetween, wherein any one of the first field generating electrode and the second field generating electrode has a plurality of cutouts, the plurality of cutouts includes a first portion forming a first angle with a reference line forming an angle of 90° with the gate line, a second portion forming a second angle that is larger than the first angle with the reference line, and a third portion forming a third angle that is larger than the first angle with the reference line, and a value obtained by multiplying a sum of a ratio of a vertical length of the second portion to a vertical length of the cutout and a ratio of a vertical length of the third portion to the vertical length of the cutout by 10 and then dividing the multiplied value by PPI of the plurality of pixels is 1 or less.

According to the exemplary embodiments of the present disclosure of invention, in a liquid crystal display, two field generating electrodes are formed on one substrate in a pixel unit cell area of the one substrate, at least one of the two field generating electrodes is formed to have one or more cutouts, and a ratio among a main branch portion, a center portion, and an edge portion of the cutout of the one field generating electrode has cutout channels bent at different angles with regard to the gate line where the cutout channels are adjusted to prevent irregular behavior of liquid crystal molecules according to external pressure from moving along the cutout and for also preventing deterioration of backlighting transmittance efficiency of the liquid crystal display.

DETAILED DESCRIPTION

Figure 1:
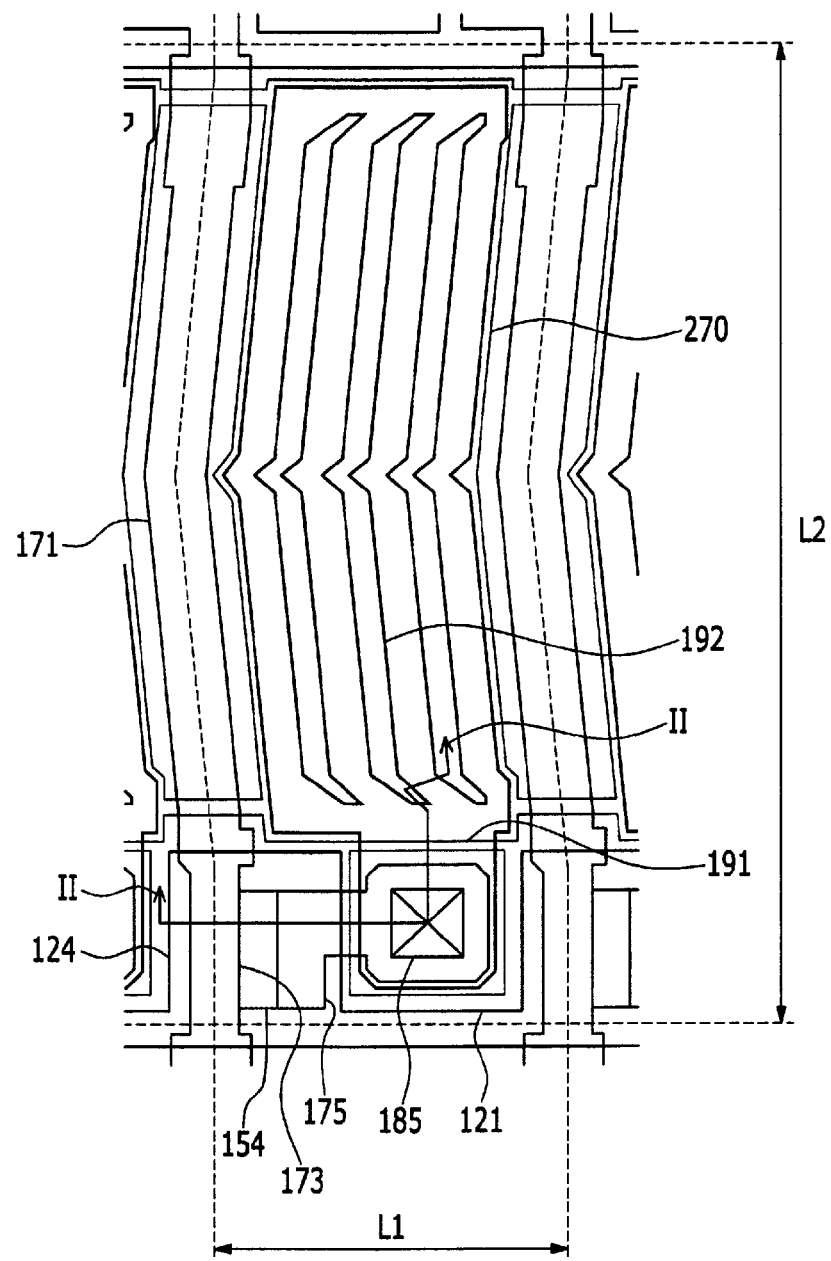
FIG. 1 is a top plan layout view of a liquid crystal display according to a first exemplary embodiment of the present disclosure.

The present disclosure of invention will be provided more fully hereinafter with reference to the accompanying drawings, in which exemplary embodiments are shown. As those skilled in the art would realize after appreciating the present disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Then, a liquid crystal display according to an exemplary embodiment of the present disclosure will be described with reference to the drawings.

Figure 2:
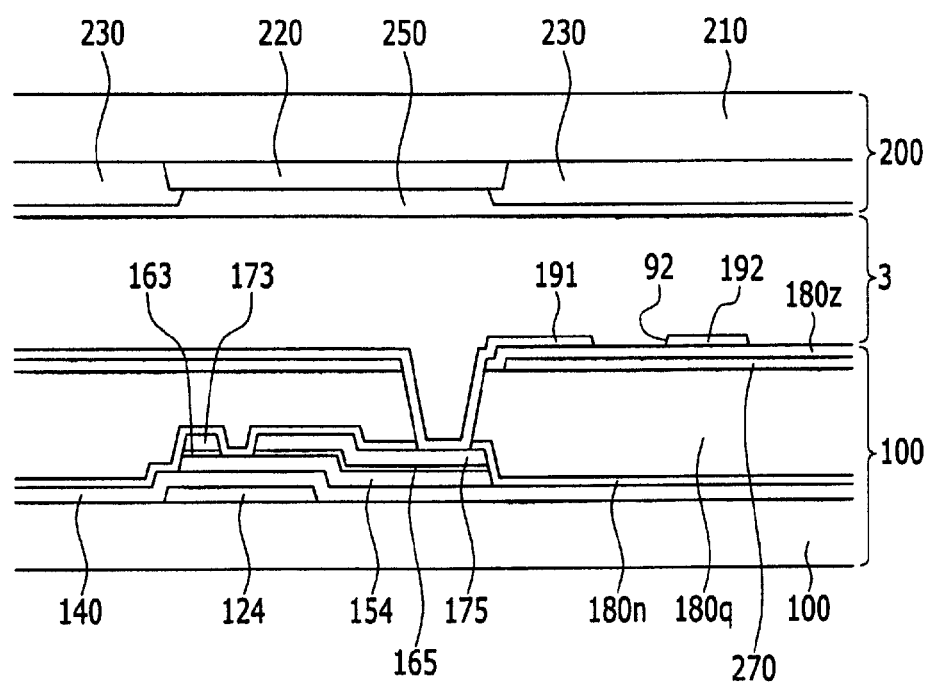
FIG. 2 is a cross-sectional view of the liquid crystal display according to the exemplary embodiment shown in FIG. 1, which is taken along line II-II.

First, the liquid crystal display according to the first exemplary embodiment will be described with reference to FIGS. 1 and 2. FIG. 1 is a top plan layout view of a liquid crystal display according to an exemplary embodiment. FIG. 2 is a cross-sectional view of the liquid crystal display according to the exemplary embodiment shown in FIG. 1, which is taken along line II-II. FIG. 1 is a layout view showing a cutout pattern of a field generating electrode of the liquid crystal display according to the first exemplary embodiment.

First, referring to FIGS. 1 and 2, the liquid crystal display according to the first exemplary embodiment includes a lower display panel 100 and a spaced apart upper display panel 200 facing the lower panel and a liquid crystal material layer 3 interposed therebetween. A highly dense matrix of pixel areas is formed on the upper and lower panels (200, 100). However, just one such pixel area is described as an example below. More specifically, the highly dense matrix of pixel areas may have a resolution in at least one direction of about 200 PPI (pixel areas pr inch) or greater. That is, about 200 or more pixels may be included in a region of about 1 inch as measured in at least one of, but preferably both of orthogonal major axes (e.g., horizontal and vertical) of the liquid crystal display. Further, the horizontal axis length L1 of one pixel area according to the exemplary embodiment may be about 40 μm or less and the vertical axis length L2 thereof may be about 120 μm or less. Three such pixel areas, each having the same 1:3 aspect ratio may be ganged together to define a substantially square luminance providing region of about 120 μm by 120 μm or less where the three, so ganged together pixel areas have respective different colors such as Red, Green and Blue which in unison can create perception of a white light. Rather than being perfectly square, the substantially square luminance providing region may include a shape such as that of two identical parallelograms joined at their corresponding boundaries to one another with one of the parallelograms being flipped upside down. Herein, as shown in the drawings, the horizontal length L1 of the pixel area is an X-axis interval between same vertical center portions of the two adjacent data lines 171, and the vertical length L2 of the pixel is a Y-axis interval between same horizontal center portions of two adjacent gate lines 121.

First, the lower display panel 100 will be described in more detail.

A generally horizontally extending, gate signal conductor is provided including a gate line 121 formed on an insulating substrate 110 where the later may be formed of a transparent glass, plastic or the like.

The gate line 121 includes a gate electrode 124 integrally branching therefrom, and a wide end portion (not shown) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties and/or different conductive materials.

A gate insulating layer 140 formed for example of a silicon nitride (SiNx), a silicon oxide (SiOx) or the like is formed on the gate line 121. However, the gate insulating layer 140 may have a multilayered structure including at least two insulating layers having different physical properties and/or different nonconductive materials.

A semiconductive element 154 made for example of amorphous silicon, polysilicon or the like is formed on the gate insulating layer 140. The semiconductive element 154 may include or may be composed of a semiconductive oxide.

Ohmic contacts 163 and 165 are formed on the semiconductive element 154. The ohmic contacts 163 and 165 may made of a material such as n+ hydrogenated amorphous silicon with which an n-type impurity such as phosphorus is doped at a high concentration, or silicide. The ohmic contact 163 and 165 may form a pair to be disposed on the semiconductor 154. In the case where the semiconductive element 154 is the semiconductive oxide, the ohmic contacts 163 and 165 may be omitted.

A generally vertically extending data signals conductor is provided, including a data line 171 having a source electrode 173 integrally branching therefrom. In the same wiring layer, a spaced apart drain electrode 175 is formed on a respective one of the ohmic contacts 163 and 165 and overlapping the gate insulating layer 140.

The data line 171 includes a wide end portion (not shown) for connection with another layer or an external driving circuit. The data line 171 transports respective data signals for application to respective pixel electrodes and mainly extends in a vertical direction to thereby cross with the gate line 121.

In the given embodiment, the data line 171 has periodically repeated first bent portions each having a bent (inclined) edge shape so that the data line 171 does not have a substantially straight line edge but rather one conforming with V-shaped contours of adjacent pixel areas, where the V-shaped contours allow for improved light transmittance through the liquid crystal display due to variation of liquid crystal domains as shall be detailed below. The first bent portions of the data line 171 may meet each other in so-called, central or middle region of the respective pixel areas to form corresponding V shapes. In one embodiment, the data line 171 additionally has periodically repeated second bent portions that are bent so as to form a predetermined angle with the first bent portions where the second bent portions may be further included in the middle regions of the corresponding pixel regions.

The first bent portion of the data line 171 may be bent so as to form about 7° with a vertical reference or major axis line y (reference line extending in a y direction) of the device. The vertical major axis line (Y) forms a 90° angle with a major extension direction (X direction) of the gate line 121. The second bent portion disposed in the middle region of the pixel region may be further bent so as to form about 7° to about 15° with the first bent portion.

The source electrode 173 is a portion of the data line 171, and disposed in a same device layer as is the data line 171. The drain electrode 175 is formed so as to extend in parallel to the source electrode 173. Accordingly, the drain electrode 175 is parallel to a portion of the data line 171.

The gate electrode 124, the source electrode 173, and the drain electrode 175 form parts of a thin film transistor (TFT) that further includes the corresponding semiconductive element 154. A channel of the thin film transistor is formed in the semiconductor 154 in the spacing between the source electrode 173 and drain electrode 175.

The liquid crystal display according to the exemplary embodiment may include the source electrode 173 positioned in the same layer as that of the data line 171 and the drain electrode 175 and extending vertically in parallel to the data line 171 to thereby increase a width of the thin film transistor while the area of the data conductor is not increased, thus increasing an opening ratio (aperture) of the pixel areas of the liquid crystal display.

It is preferable that the data line 171 and the drain electrode 175 be made of refractory metal such as molybdenum, chromium, tantalum, and titanium, or an alloy thereof, and may have a multilayered structure including a refractory metal layer (not shown) and a low resistance conductive layer (not shown). Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the data line 171 and the drain electrode 175 may be made of various metals or conductors in addition to this. The width of the data line 171 may be about 3.5 µm±0.75.

A first passivation layer 180n is disposed on exposed portions of the data conductors 171, 173, and 175, the gate insulating layer 140, and the semiconductor 154. The first passivation layer 180x may be formed of an organic insulating material, an inorganic insulating material or the like.

A second passivation layer 180q is disposed on the first passivation layer 180n. The second passivation layer 180q may be omitted. The second passivation layer 180q may be a color filter. In the case where the second passivation layer 180q is the color filter, the second passivation layer 180q may intrinsically display any one of primary colors, and examples of the primary colors may include three primary colors such as red, green, or blue, yellow, cyan, magenta, or the like and the color filter 230 of the upper substrate 200 may be omitted. Although not shown in the drawings, the color filter may further include a color filter displaying a mixed color of the primary colors or white or clear in addition to the primary colors.

A reference electrode 270 is formed on the second passivation layer 180q.

The reference electrode 270 may have a planar shape shape and be formed on the entire surface of the substrate 110 to have a whole plate shape, and may have an opening (not shown) disposed in a region corresponding to the circumference of the drain electrode 175. That is, the reference electrode 270 may have a substantially flat plate shape.

The reference electrodes 270 disposed in adjacent pixels may be connected to each other to receive a common voltage (Vcom) having a predetermined magnitude as supplied from a source outside of the display region.

A third passivation layer 180z is disposed on the reference electrode 270. The third passivation layer 180z may be formed of an organic insulating material, an inorganic insulating material or the like.

A patterned pixel electrode 191 is formed on the third passivation layer 180z. The patterned pixel electrode 191 includes a curved edge that is almost parallel to the first bent portion and the second bent portion of the data line 171. The pixel electrode 191 has a plurality of first cutouts 92, and includes a plurality of first branch electrodes 192 defined by conductive electrode material disposed between the plurality of first cutouts 92. The pixel electrode 191 includes the first cutouts 92 having the same shape as a basic (template) electrode piece 199 described below with reference to FIG. 6 and a plurality of first branch electrodes 192 according thereto. The first cutouts 92 of the pixel electrode 191 includes a main branch portion forming a first angle θ1 with the vertical reference line (reference line extending in the Y axis direction, see FIG. 8). As mentioned, the Y axis direction forms 90° with the general extension direction (X axis direction) of the gate line 121, where a center portion forms a second angle θ2 (FIG. 8) with the vertical Y reference line, and an edge portion forms a third angle θ3 with the vertical reference line. The second angle θ2 and the third angle θ3 may be larger than the first angle θ1. The main branch portion of the first cutout 92 of the pixel electrode 191 may have a length that is about 80% or more of the entire length of the cutout, the center portion may have a length that is about 6% to about 13% of the entire length of the cutout, and the edge portion may have a length that is about 0% to about 10% of the entire length of the cutout. Here, the length of the cutout is as measured along the Y axis. Further, a value obtained by multiplying a sum of a ratio of the center section portion (CS—see FIG. 6) to the entire length of the first cutout 92 of the pixel electrode 191 and a ratio of the edge portion (ES) to the entire length of the cutout by 10 and then dividing the multiplied value by PPI of the liquid crystal display may be about 1 or less. Further, a value obtained by multiplying the sum of the ratio of the center portion to the entire length of the first cutout 92 of the pixel electrode 191 and the ratio of the edge portion to the entire length of the cutout by a vertical length of one pixel may be about 20 µm or less. Further, a value obtained by multiplying the ratio of the center portion to the entire length of the first cutout 92 of the pixel electrode 191 by the vertical length of one pixel may be about 5 µm or less. Further, a value obtained by multiplying the ratio of the edge portion to the entire length of the first cutout 92 of the pixel electrode 191 by the vertical length of one pixel may be about 5 µm or less.

A first contact hole 185 through which the drain electrode 175 is exposed is formed extending through the first passivation layer 180n, the second passivation layer 180q, and the third passivation layer 180z. The pixel electrode 191 is physically and electrically connected to the drain electrode 175 through the first contact hole 185 to receive a voltage from the drain electrode 175 when the TFT is turned on.

Although not shown in the drawings, an alignment layer may be applied on the pixel electrode 191 and the third passivation layer 180z, may be a horizontal alignment layer, and may be rubbed in a predetermined direction. However, in the liquid crystal display according to another exemplary embodiment, the alignment layer may include an optical reaction material to be optically aligned (e.g., cured upon exposure to UV light).

Next, the upper display panel 200 will be described.

A light blocking member (a.k.a. black matrix element) 220 is formed on the insulating substrate 210 where the latter is made of transparent glass, plastic or the like. The light blocking member 220 is also called a black matrix (BM) and prevents light leakage.

A plurality of color filters 230 is formed on the substrate 210. In the case where the second passivation layer 180q of the lower display panel 100 is a color filter, the color filter 230 of the upper display panel 200 may be omitted. Further, the light blocking member 220 of the upper display panel 200 may be formed in the lower display panel 100.

A planarized overcoat 250 is formed on the color filter 230 and the light blocking member 220. The overcoat 250 is made of an (organic) insulator, and it prevents exposure of the color filter 230 while providing a flat surface. The overcoat 250 may be omitted.

A second alignment layer may be disposed on the overcoat 250.

The liquid crystal layer 3 includes a nematic liquid crystal material having positive dielectric anisotropy. The liquid crystal molecules of the liquid crystal layer 3 are arranged so that a long axis direction thereof is parallel to the display panels 100 and 200, and the liquid crystal layer has a twisted spiral structure where the direction thereof is 90° from the rubbing direction of the alignment layer of the lower display panel 100 to the upper display panel 200.

The pixel electrode 191 receives a data voltage from the drain electrode 175. At the same time, the reference electrode 270 receives a reference voltage (Vcom) having a predetermined size from a reference voltage application portion disposed in the outside of the display region.

The liquid crystal molecules of the liquid crystal layer 3 positioned between the two electrodes 191 and 270 are rotated in a direction that is parallel to a direction of an electric field generated by the applied voltage between the pixel electrode 191 and the reference electrode 270. As described above, according to the determined rotation direction of the liquid crystal molecule, the polarization of light passing through the liquid crystal layer is changed.

Figure 3:
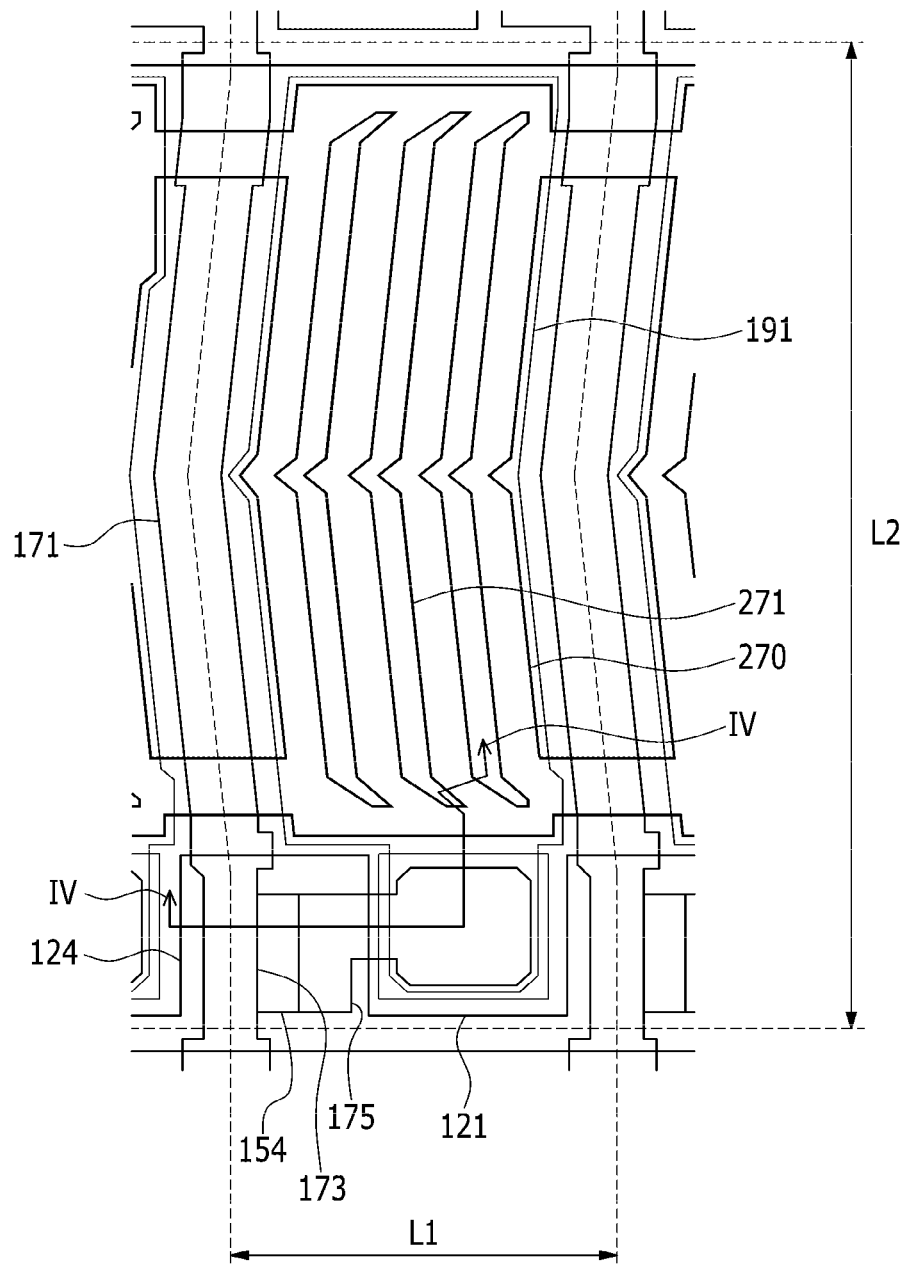
FIG. 3 is a top plan layout view of a liquid crystal display according to another exemplary embodiment.

Next, the liquid crystal display according to another exemplary embodiment will be described with reference to FIGS. 3 and 4. FIG. 3 is a layout view of a liquid crystal display according to another (second) exemplary embodiment, and FIG. 4 is a cross-sectional view of the liquid crystal display according to the exemplary embodiment shown in FIG. 3, which is taken along line IV-IV.

Figure 4:
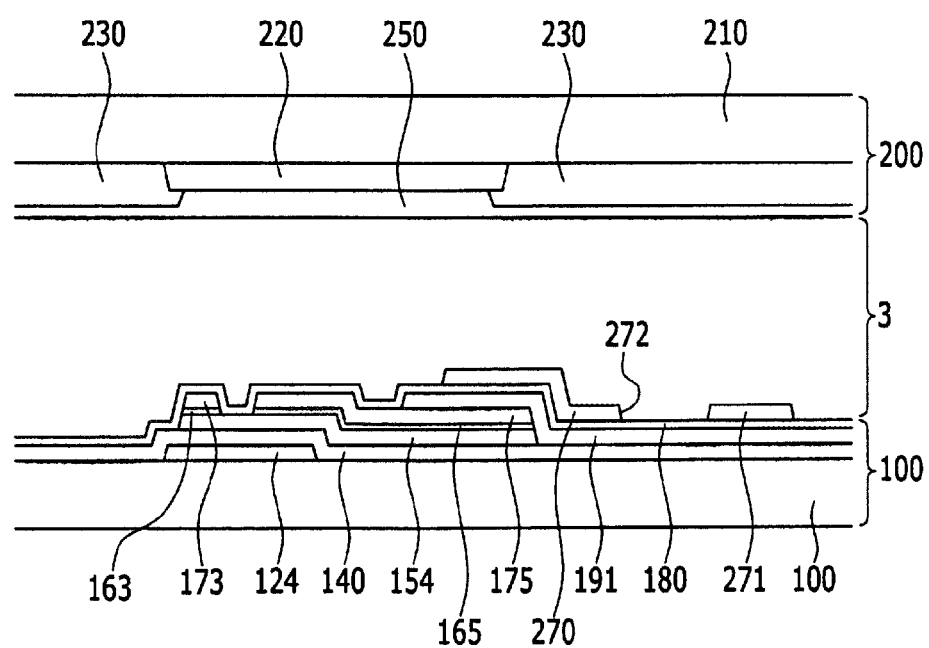
FIG. 4 is a cross-sectional view of the liquid crystal display according to the exemplary embodiment shown in FIG. 3, which is taken along line IV-IV.

With reference to FIGS. 3 and 4, the liquid crystal display according to the present exemplary embodiment is almost similar to the liquid crystal display according to the exemplary embodiment shown in FIGS. 1 and 2. Briefly, the positioning and patternings of the common electrode (270) and pixel electrode (191) are reversed and the drain contact hole is done away with.

Referring to FIGS. 3 and 4 in more detail, the liquid crystal display according to the exemplary embodiment includes the lower display panel 100 and the upper display panel 200 facing each other, and the liquid crystal layer 3 injected therebetween. One pixel area is described as an example below, but the liquid crystal display according to the exemplary embodiment may have resolution of about 200 PPI or more. That is, about 200 or more pixels may be included in a region about 1 inch in each dimension in the liquid crystal display. Further, the horizontal length L1 of one pixel of the liquid crystal display according to the exemplary embodiment may be about 40 μm or less and the vertical length L2 thereof may be about 120 μm or less. Herein, as shown in the drawings, the horizontal length L1 of the pixel is an interval between vertical central portions of the two adjacent data lines 171, and the vertical length L2 of the pixel means an interval between horizontal central portions of the two adjacent gate lines 121.

First, the lower display panel 100 will be described.

The gate conductor including the gate line 121 is formed on the insulating substrate 110.

The gate insulating layer 140 formed of a silicon nitride (SiNx), a silicon oxide (SiOx) or the like is formed on the gate conductor 121.

The semiconductor 154 is formed on the gate insulating layer 140.

Ohmic contacts 163 and 165 are formed on the semiconductor 154. In the case where the semiconductor 154 is a semiconductive oxide, the ohmic contacts 163 and 165 may be omitted.

The data conductor including the data line 171 including the source electrode 173 and the drain electrode 175 is formed on the ohmic contacts 163 and 165 and the gate insulating layer 140.

The pixel electrode 191 is formed directly on and thus electrically contacting the drain electrode 175. The pixel electrode 191 is disposed in one pixel region to have a planar shape, that is for example, a plate shape.

The passivation layer 180 is disposed on the data conductors 171, 173, and 175, the gate insulating layer 140, the exposed portion of the semiconductor 154, and the pixel electrode 191. However, in the liquid crystal display according to another exemplary embodiment, the passivation layer 180 may be disposed between the pixel electrode 191 and the data line 171, and the pixel electrode 191 may be connected through the contact hole (not shown) formed in the passivation layer 180 to the drain electrode 175.

In the embodiment of FIGS. 3-4, it is the reference electrode 270 which is patterned to have cutouts and it is formed on top of the passivation layer 180. The reference electrodes 270 are connected to each other to receive the reference voltage (Vcom) from the reference voltage application portion disposed in the outside of the display region.

The reference electrode 270 includes the curved edges that are almost parallel to the first bent portion and the second bent portion of the data line 171, and the reference electrodes 270 disposed in the adjacent pixels are connected to each other. The reference electrode 270 has a plurality of second cutouts 272, and includes a plurality of second branch electrodes 271 defined by a plurality of second cutouts 272. The reference electrode 270 includes the second cutouts 272 having the same shape as the basic (template) electrode 199 described below with reference to FIG. 6 and a plurality of second branch electrodes 271 according thereto. The second cutouts 272 of the reference electrode 270 includes the main branch portion forming the first angle θ1 with the vertical reference line (reference line extending in a y direction) forming 90° with the extension direction (x direction) of the gate line 121, the center portion forming the second angle θ2 with the vertical reference line, and the edge portion forming the third angle θ3 with the vertical reference line. The second angle θ2 and the third angle θ3 may be larger than the first angle θ1. The vertical length of the main branch portion of the second cutout 272 of the reference electrode 270 may be about 80% or more of the vertical length of the cutout. Here, the vertical length is measured in a direction parallel to the vertical reference line (reference line extending in a y direction). The vertical length of the center portion may be about 6% to about 13% of the vertical length of the cutout and the vertical length of the edge portion may be about 0% to about 10% of the vertical length of the cutout. Further, the value obtained by multiplying the sum of the ratio of the vertical length of the center portion to the vertical length of the second cutout 272 of the reference electrode 270 and the ratio of the vertical length of the edge portion to the vertical length of the cutout by 10 and then dividing the multiplied value by PPI of the liquid crystal display may be about 1 or less. Further, the value obtained by multiplying the sum of the ratio of the vertical length of the center portion to the vertical length of the second cutout 272 of the reference electrode 270 and the ratio of the vertical length of the edge portion to the vertical length of the cutout by the vertical length of one pixel may be about 20 µm or less. Further, the value obtained by multiplying the ratio of the vertical length of the center portion to the vertical length of the second cutout 272 of the reference electrode 270 by the vertical length of one pixel may be about 5 µm or less. Further, the value obtained by multiplying the ratio of the vertical length of the edge portion to the vertical length of the second cutout 272 of the reference electrode 270 by the vertical length of one pixel may be about 5 µm or less.

Although not shown in the drawings, a first alignment layer may be applied on the reference electrode 270 and to the passivation layer 180, where the first alignment layer may be a horizontal alignment layer, and may be rubbed in a predetermined direction. However, in the liquid crystal display according to another exemplary embodiment, the alignment layer may include an optical reaction material to be optically aligned (e.g., cured by UV light after being electrically aligned).

Then, the upper display panel 200 will be described.

The light blocking member 220 is formed on the insulating substrate 210. A plurality of color filters 230 is formed on the substrate 210. In the case where the color filter 230 may be disposed on the lower display panel 100, and in this case, the light blocking member 220 may be disposed in the lower display panel 100.

The overcoat 250 is formed on the color filter 230 and the light blocking member 220. The overcoat 250 may be omitted.

A second alignment layer may be disposed on the overcoat 250. The liquid crystal layer 3 includes a nematic liquid crystal material having positive dielectric anisotropy. The liquid crystal molecules of the liquid crystal layer 3 are arranged so that a long axis direction thereof is parallel to the display panels 100 and 200, and the liquid crystal layer has a twisted spiral structure where the direction thereof is 90° from the rubbing direction of the alignment layer of the lower display panel 100 to the upper display panel 200.

Figure 5:
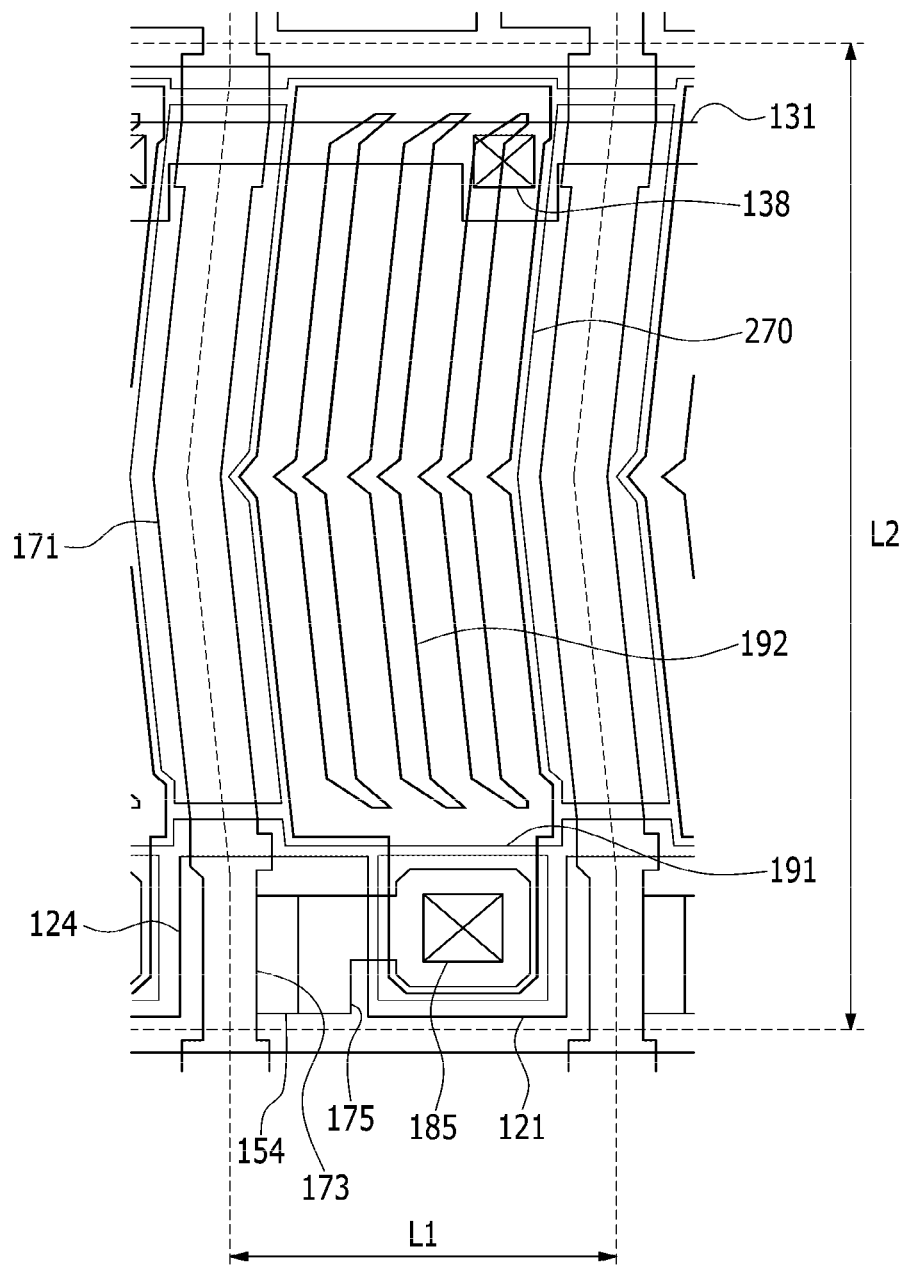
FIG. 5 is a top plan layout view of a liquid crystal display according to another exemplary embodiment.

Next, the liquid crystal display according to another (third) exemplary embodiment will be described with reference to FIG. 5. FIG. 5 is a layout view of a liquid crystal display according to another exemplary embodiment having additional feature 138 (second contact hole).

Referring to FIG. 5 in more detail, the liquid crystal display according to the present exemplary embodiment is similar to the liquid crystal display according to the exemplary embodiment shown in FIGS. 1 and 2. A detailed description of the similar constituent elements will be omitted.

However, the liquid crystal display according to the present exemplary embodiment further includes a reference voltage supplying line 131 formed of the gate conductor like the gate line 121 unlike the liquid crystal display according to the exemplary embodiment shown in FIGS. 1 and 2. The reference voltage supplying line 131 transfers a predetermined reference voltage (Vcom) to corresponding reference electrode portions, and it includes a respective extension portion for connection with the reference electrode 270 of each respective pixel area. The reference voltage line 131 may extend parallel to the gate line 121 and be formed of the same material(s) as that of the gate line 121.

The reference electrode 270 may be physically and electrically connected through the second contact hole 138 formed in the first passivation layer 180*n* and the second passivation layer 180*q* to the reference voltage supplying line 131 to thereby receive a common voltage (Vcom) having a predetermined size from the reference voltage line 131.

The reference electrodes 270 of respective pixel areas may be connected to each other to receive the reference voltage from the reference voltage application portion disposed in the outside of the display region, but may be additionally connected to the reference voltage line 131 to receive the reference voltage, thus preventing the reference voltage from being reduced in the display region due to the higher resistivity of the material of the reference electrode 270 taken alone.

Like the aforementioned liquid crystal display according to the exemplary embodiment described with reference to FIGS. 1 and 2, the pixel electrode 191 of the liquid crystal display according to the present exemplary embodiment includes the first cutout 92 having the same shape as the basic electrode 199 described below with reference to FIG. 6 and a plurality of first branch electrodes 192 according thereto. The first cutouts 92 of the pixel electrode 191 includes the main branch portion forming the first angle θ1 with the vertical reference line (reference line extending in a y direction) forming 90° with the extension direction (x direction) of the gate line 121, the center portion forming the second angle θ2 with the vertical reference line, and the edge portion forming the third angle θ3 with the vertical reference line. The second angle θ2 and the third angle θ3 may be larger than the first angle θ1. The vertical length of the main branch portion of the second cutout 272 of the reference electrode 270 may be about 80% or more of the vertical length of the cutout. Here, the vertical length is measured in a direction parallel to the vertical reference line (reference line extending in a y direction). The vertical length of the center portion may be about 6% to about 13% of the vertical length of the cutout and the vertical length of the edge portion may be about 0% to about 10% of the vertical length of the cutout. Further, the value obtained by multiplying the sum of the ratio of the vertical length of the center portion to the vertical length of the second cutout 272 of the reference electrode 270 and the ratio of the vertical length of the edge portion to the vertical length of the cutout by 10 and then dividing the multiplied value by PPI of the liquid crystal display may be about 1 or less. Further, the value obtained by multiplying the sum of the ratio of the vertical length of the center portion to the vertical length of the second cutout 272 of the reference electrode 270 and the ratio of the vertical length of the edge portion to the vertical length of the cutout by the vertical length of one pixel may be about 20 µm or less. Further, the value obtained by multiplying the ratio of the vertical length of the center portion to the vertical length of the second cutout 272 of the reference electrode 270 by the vertical length of one pixel may be about 5 µm or less. Further, the value obtained by multiplying the ratio of the vertical length of the edge portion to the vertical length of the second cutout 272 of the reference electrode 270 by the vertical length of one pixel may be about 5 µm or less.

Next, a basic patterned electrode 199 corresponding to one of the field generating electrodes (either the pixel electrode if it is patterned or the reference electrode if it is patterned) of the liquid crystal display according to an exemplary embodiment will be described with reference to FIG. 6.

Figure 6:
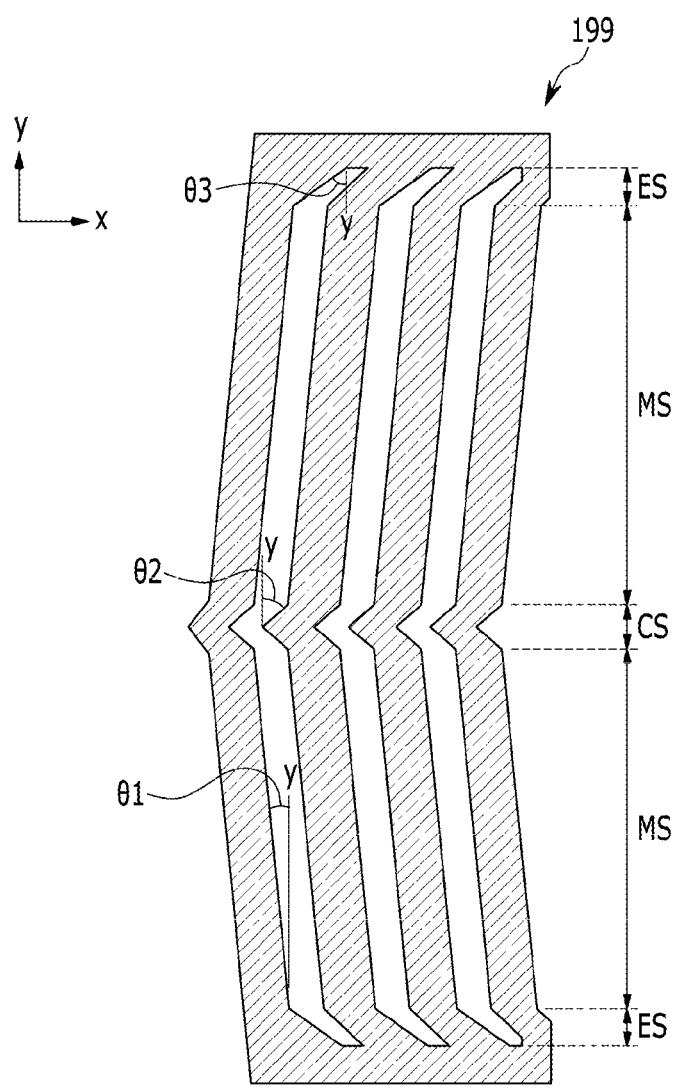
FIG. 6 is a top plan layout view showing a cutout of a field generating electrode of the liquid crystal display according to the exemplary embodiment.

Referring to FIG. 6, the cutout of the basic electrode of the field generating electrode of the liquid crystal display according to the exemplary embodiment includes the main branch portion MS (interposed between central section CS and end section ES and) forming the first angle θ1 with the vertical reference line (reference line extending in a y direction) forming 90° with the extension direction (x direction) of the gate line 121. It further includes the center portion CS forming the second angle θ2 with the vertical reference line, and the edge portion ES forming the third angle θ3 with the vertical reference line. The second angle θ2 and the third angle θ3 may be larger than the first angle θ1. For example, the first angle θ1 may be about 5° to about 20°, and the second angle θ2 may be about 40° to about 50°.

Likewise, the cutout of the basic electrode of the field generating electrode is formed so as to further include the center portion CS and the edge portion ES having the angle that is larger than the angle of the main branch portion MS with respect to the vertical reference line, in addition to the main branch portion (MS). That is, the cutout is bent at a large angle at a boundary portion of the main branch portion MS and the center portion (CS), and the cutout is bent at a large angle at a boundary portion of the main branch portion MS and the edge portion (ES). Therefore, in a case where external pressure and the like are applied from the outside (e.g., by a user's finger) to press on the center portion CS and/or to the edge portion (ES), it is possible to prevent a spreading of the pressure-induced irregular positions of liquid crystal molecules directly to the main branch portion (MS). Specifically, irregular behavior of the liquid crystal molecules occurring at the center portion CS and the edge portion ES is not moved in a straight line to and along the boundary portion with the main branch portion MS that is bent at a large angle relative to the direction of the externally generated pressure wave(s). Therefore, it is possible to prevent a bruising phenomenon according to external pressures and the like.

As described above, the liquid crystal display according to the exemplary embodiments may have resolution of about 200 PPI or more. That is, about 200 or more pixels may be included in a region about 1 inch in each dimension in the liquid crystal display. Further, the horizontal length of one pixel of the liquid crystal display according to the exemplary embodiment of the present invention may be about 40 μm or less and the vertical length thereof may be about 120 μm or less.

The vertical length of the main branch portion MS of the cutout of the basic electrode of the field generating electrode may be about 80% or more of the vertical length of the cutout, the vertical length of the center portion CS may be about 6% to about 13% of the vertical length of the cutout, and the vertical length of the edge portion ES may be about 0% to about 10% of the vertical length of the cutout.

The vertical length of the center portion CS of the cutout and the vertical length of the edge portion ES of the cutout may be about 5 μm or less, and the vertical length of the cutout may be about 100 μm.

Further, the value obtained by multiplying the sum of the ratio (%) of the vertical length of the center portion CS to the vertical length of the cutout and the ratio (%) of the vertical length of the edge portion ES to the vertical length of the cutout by 10 and then dividing the multiplied value by PPI of the liquid crystal display may be about 1 or less.

Further, the value obtained by multiplying the sum of the ratio of the vertical length of the center portion CS to the vertical length of the cutout and the ratio of the vertical length of the edge portion ES to the vertical length of the cutout by the vertical length of one pixel may be about 20 μm or less.

Further, the value obtained by multiplying the ratio of the vertical length of the center portion CS to the vertical length of the cutout by the vertical length of one pixel may be about 5 μm or less.

Further, the value obtained by multiplying the ratio of the vertical length of the edge portion ES to the vertical length of the cutout by the vertical length of one pixel may be about 5 μm or less.

Likewise, light transmittance through the pixel area apertures of the liquid crystal display may be increased by increasing the vertical length of the ratio of the main branch portion MS of the cutout of the field generating electrode to the vertical length of the cutout and reducing the ratio of one or both of the center portion CS and the edge portion ES thereto.

Next, the transmittance of the liquid crystal display according to Experimental Examples will be described with reference to Tables 1 and 2 and FIG. 7.

That is, in the present Experimental Example, the light-passing transmittance was measured while the resolution of the liquid crystal display, for example, PPI, that is, the total number of pixels disposed in the region about 1 inch in each dimension in the liquid crystal display, the horizontal length and the vertical length of the pixel, the vertical length of the cutout, the vertical length of the center portion CS of the cutout, the vertical length of the edge portion ES of the cutout and the like were changed, and a result thereof is described in the following Table 1. For example, the transmittance was measured, in similar manner to how done for a known liquid crystal display, in the cases where the ratio of the vertical length of the center portion CS of the cutout and the ratio of the vertical length of the edge portion ES to the vertical length (L) of the cutout were formed (Case A1, Case A2, and Case A3), and like the liquid crystal display according to the exemplary embodiment of the present invention, in the cases where the ratio of the vertical length of the center portion CS of the cutout and the ratio of the vertical length of the edge portion ES to the vertical length of the cutout were adjusted (Case B1, Case B2, Case B3, Case B4, and Case B5). All other conditions were the same. When the same fluidic disturbance pressure was applied to all the liquid crystal displays manufactured in the present Experimental Examples, it was found that a bruising phenomenon does not occur.

TABLE 1

| Case | PPI | Horizontal length of the pixel | Vertical length of the pixel | Entire length of the cutout | (CS) Length of the center portion | (ES) Length of the edge portion | (CS/L) Ratio of the center portion | (ES/L) Ratio of the edge portion | Transmittance (%) |
|---|---|---|---|---|---|---|---|---|---|
| Case A1 | 264 | 32 | 96 | 73.5 | 10 | 7.5 | 13.60% | 20.40% | 3.8 |
| Case A2 | 200 | 42 | 126 | 91 | 10 | 7.5 | 11.00% | 16.50% | 4.4 |
| Case A3 | 200 | 42 | 126 | 91 | 5 | 7.5 | 5.50% | 16.50% | 4.4 |
| Case B1 | 264 | 32 | 96 | 79.4 | 5 | 5 | 5.21% | 10.42% | 4.4 |
| Case B2 | 264 | 32 | 96 | 79.4 | 0 | 3 | 0.00% | 6.25% | 4.7 |
| Case B3 | 264 | 32 | 96 | 79.4 | 0 | 5 | 0.00% | 10.42% | 4.6 |

TABLE 1-continued

| Case | PPI | Horizontal length of the pixel | Vertical length of the pixel | Entire length of the cutout | (CS) Length of the center portion | (ES) Length of the edge portion | (CS/L) Ratio of the center portion | (ES/L) Ratio of the edge portion | Transmittance (%) |
|---|---|---|---|---|---|---|---|---|---|
| Case B4 | 264 | 32 | 96 | 79.4 | 5 | 4 | 5.21% | 8.33% | 4.5 |
| Case B5 | 264 | 32 | 96 | 79.4 | 4 | 0 | 4.17% | 0.00% | 4.6 |

Referring to the aforementioned Table 1, it can be seen that as compared to the cases where the ratio of the vertical length of the center portion CS of the cutout and the ratio of the vertical length of the edge portion ES to the vertical length (L) of the cutout are relatively large, for example, the ratio of the edge portion ES of the cutout is about 7.5% and the ratio of the center portion CS is about 15% or more (Case A1, Case A2, and Case A3), like the liquid crystal display according to the exemplary embodiment, in the cases where the ratio of the center portion CS of the cutout and the ratio of the edge portion ES to the entire length of the cutout are adjusted (Case B1, Case B2, Case B3, Case B4, and Case B5), the transmittance of the liquid crystal display is increased even though PPI of the liquid crystal display is large (e.g., ≥200 PPI). That is, it can be seen that like the liquid crystal display according to the exemplary embodiment, if the ratio of the vertical length of the center portion CS of the cutout and the ratio of the vertical length of the edge portion ES to the vertical length of the cutout are adjusted, the transmittance of the liquid crystal display is increased even though the liquid crystal display is formed to have high resolution (e.g., ≥200 PPI).

Likewise, it can be seen that in the liquid crystal display according to the exemplary embodiment, it is possible to prevent a bruising phenomenon according to external pressure and prevent a reduction in transmittance of the liquid crystal display.

In the present Experimental Example, the value A obtained by multiplying the sum of the ratio of the vertical length of the center portion CS to the vertical length of the cutout and the ratio of the vertical length of the edge portion ES to the vertical length of the cutout by 10 and then dividing the multiplied value by PPI of the liquid crystal display, the value B obtained by multiplying the sum of the ratio of the vertical length of the center portion CS to the vertical length of the cutout and the ratio of the vertical length of the edge portion ES to the vertical length of the cutout and the vertical length of one pixel, the value C obtained by multiplying the ratio of the vertical length of the center portion CS to the vertical length of the cutout and the vertical length of one pixel, and the value D obtained by multiplying the ratio of the vertical length of the edge portion ES to the vertical length of the cutout and the vertical length of one pixel were calculated, and are described in the following Table 2.

TABLE 2

| case | A | B (μm) | C (μm) | D (μm) | Transmittance (%) |
|---|---|---|---|---|---|
| Case A1 | 1.29 | 32.6 | 9.6 | 7.20 | 3.8 |
| Case A2 | 1.38 | 34.6 | 12.6 | 9.45 | 4.4 |
| Case A3 | 1.10 | 27.7 | 6.3 | 9.45 | 4.4 |
| Case B1 | 0.59 | 15.0 | 4.8 | 4.80 | 4.4 |
| Case B2 | 0.24 | 6.0 | 0.0 | 2.88 | 4.7 |
| Case B3 | 0.39 | 10.0 | 0.0 | 4.80 | 4.6 |
| Case B4 | 0.51 | 13.0 | 4.8 | 3.84 | 4.5 |
| Case B7 | 0.16 | 4.0 | 3.8 | 0.00 | 4.6 |

Referring to Table 2, it can be seen that like the liquid crystal display according to the exemplary embodiment of the present invention, in the case where the value obtained by multiplying the sum of the ratio of the vertical length of the center portion CS to the vertical length of the cutout and the ratio of the vertical length of the edge portion ES to the vertical length of the cutout by 10 and then dividing the multiplied value by PPI of the liquid crystal display is about 1 or less (Case B1, Case B2, Case B3, Case B4, and Case B5), the transmittance is increased.

Further, it can be seen that like the liquid crystal display according to the exemplary embodiment of the present invention, in the case where the value obtained by multiplying the sum of the ratio of the vertical length of the center portion CS to the vertical length of the cutout and the ratio of the vertical length of the edge portion ES to the vertical length of the cutout and the vertical length of one pixel is about 20 μm or less (Case B1, Case B2, Case B3, Case B4, and Case B5), the transmittance is increased.

Further, it can be seen that like the liquid crystal display according to the exemplary embodiment, in the case where the value obtained by multiplying the ratio of the vertical length of the center portion CS to the vertical length of the cutout and the vertical length of one pixel is about 5 μm or less (Case B1, Case B2, Case B3, Case B4, and Case B5), the transmittance is increased.

Further, it can be seen that like the liquid crystal display according to the exemplary embodiment of the present invention, in the case where the value obtained by multiplying the ratio of the vertical length of the edge portion ES to the vertical length of the cutout and the vertical length of one pixel is about 5 μm or less (Case B1, Case B2, Case B3, Case B4, and Case B5), the transmittance is increased.

Next, the bruising phenomenon of the liquid crystal display according to an Experimental Example of the present invention will be described with reference to FIG. 7 parts (a) and (b). FIG. 7 is an electronic microscope picture showing a result of transmittance of a portion of the liquid crystal display according to an Experimental Example of the present invention.

In the present Experimental Example, the second angle θ2 was changed in two cases (Case A1 and Case B4) in the Experimental Example described with reference to Table 1. Specifically, in the case (7a) where the vertical length of the center portion CS of the cutout of the field generating electrode is about 10 μm and the second angle θ2 is about 25° (Case A1) like the known liquid crystal display, and in the case (7b) where the vertical length of the center portion CS of the cutout of the field generating electrode is about 5 μm and the second angle θ2 is about 45° (Case B4) like the liquid crystal display according to the exemplary embodiment of the present invention, after external pressures having the same magnitude are applied, the center portion of the cutout is observed by an electronic microscope, and the respective results thereof is shown in FIG. 7 parts (a) and (b).

Figure 7A:
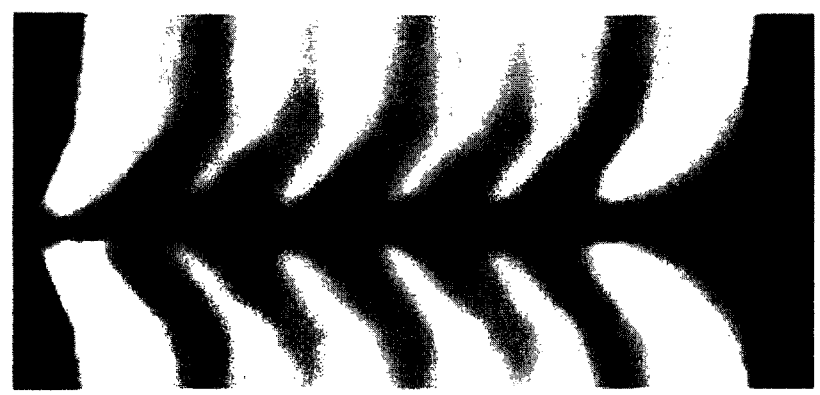
FIGS. 7a and 7b are electronic microscope pictures showing results of transmittance measurement of a portion of the liquid crystal display according to Experimental Examples.
Figure 7B:
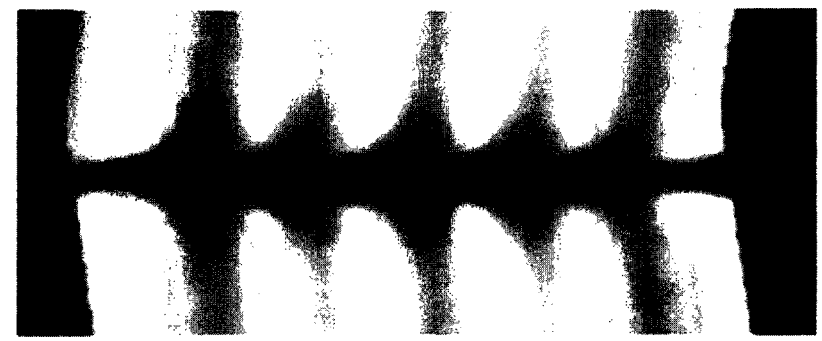

More specifically, FIG. 7(*a*) shows the result of the present Experimental Example (Case A1), and FIG. 7(*b*) shows the result of the present Experimental Example (Case B4).

Referring to FIG. 7, when the same external pressure is applied, it can be seen that in the case of the exemplary embodiment of the present invention (Case B4), like the case of a known liquid crystal display (Case A1), a transmittance deterioration portion according to irregular behavior of liquid crystal is formed only at the center portion CS of the cutout but is not diffused to the main branch portion MS of the cutout. Likewise, it can be seen that the liquid crystal display according to the exemplary embodiment of the present invention can prevent movement of irregular behavior of the liquid crystal molecules according to the external pressure along the cutout and also prevent deterioration in transmittance in the liquid crystal display having high resolution.

Next, the cutout of the basic electrode of the field generating electrode of the liquid crystal display according to another exemplary embodiment of the present invention will be described with reference to FIGS. 8 to 14. FIGS. 8 to 14 are respective layout views showing the cutout of the field generating electrode of the liquid crystal display according to respective other exemplary embodiments of the present invention.

Figure 8:
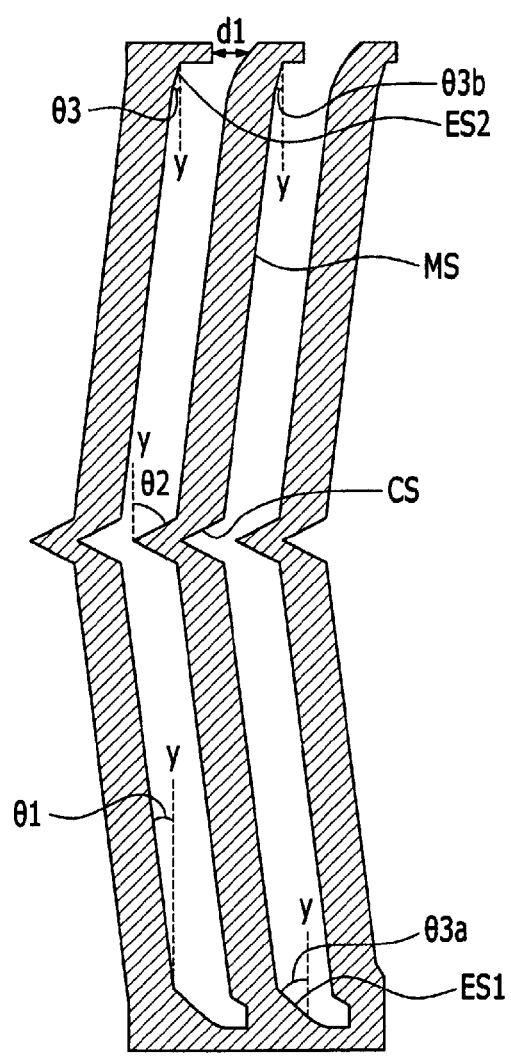
FIGS. 8, 9, 10, 11, 12, 13, and 14 are top plan layout views showing the cutout of the field generating electrode of the liquid crystal display according to other exemplary embodiments.

Referring to FIG. 8, the cutout of the basic electrode of the field generating electrode of the liquid crystal display according to the present exemplary embodiment is similar to the cutout of the basic electrode of the field generating electrode of the liquid crystal display according to the exemplary embodiments described with reference to FIGS. 1 to 6.

The cutout of the basic electrode of the field generating electrode includes the main branch portion MS forming the first angle θ1 with the vertical reference line forming 90° with the extension direction of the gate line, the center portion CS forming the second angle θ2 with the vertical reference line, and the edge portion ES forming the third angle θ3 with the vertical reference line. The second angle θ2 and the third angle θ3 may be larger than the first angle θ1.

However, the edge portion ES of the cutout of the basic electrode of the field generating electrode of the liquid crystal display according to the present exemplary embodiment has the first edge portion ES1 disposed in the lower portion of the pixel region and the second edge portion ES2 disposed on the upper portion of the pixel region.

The angle θ3*b* formed by the second edge portion ES2 and the vertical reference line is smaller than the angle θ3*a* formed by the first edge portion ES1 and the vertical reference line, and the length of the second edge portion ES2 is smaller than the length of the first edge portion ES1.

Further, the end portion of the second edge portion ES2 is not surrounded by the field generating electrode but is opened.

All characteristics of the liquid crystal display according to the exemplary embodiments described with reference to FIGS. 1 to 6 may be applied to the liquid crystal display according to the present exemplary embodiment.

Figure 9:
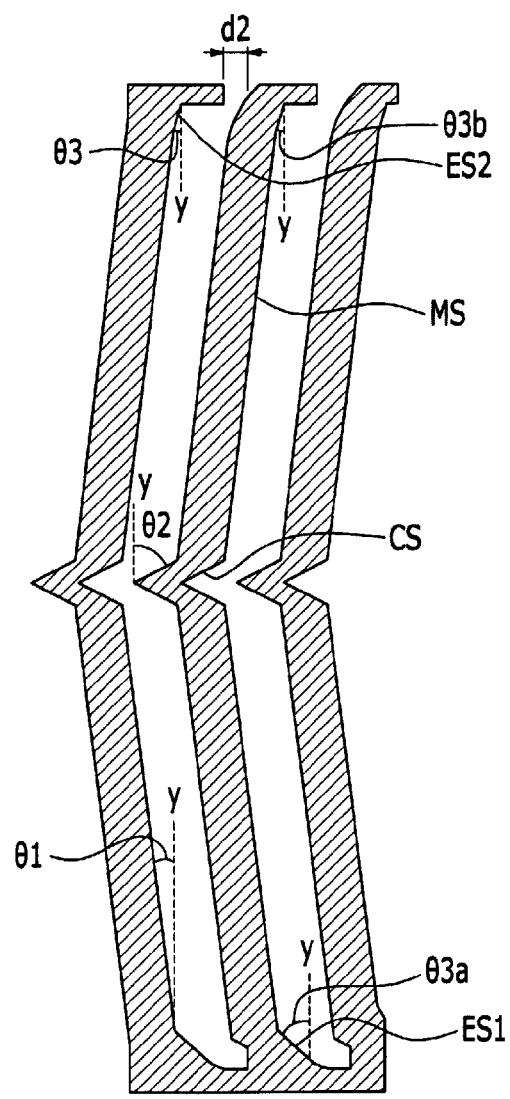
Figure 10:
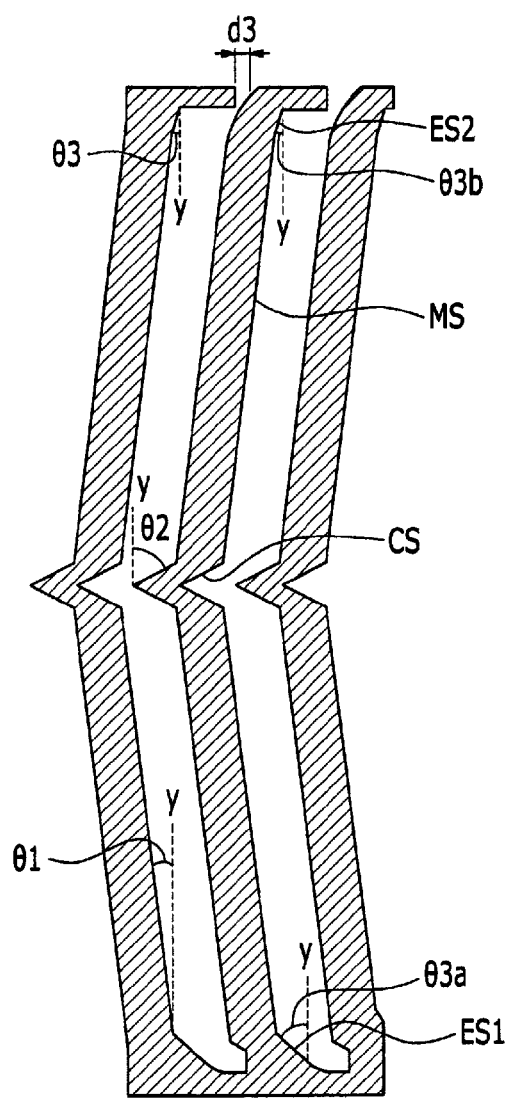

Referring to FIGS. 9 and 10, the corresponding cutout of the basic electrode of the field generating electrode of the liquid crystal display according to the present exemplary embodiment is similar to the cutout of the basic electrode of the field generating electrode of the liquid crystal display according to the exemplary embodiment described with reference to FIGS. 1 to 6 and the cutout of the basic electrode of the field generating electrode of the liquid crystal display according to the exemplary embodiment described with reference to FIG. 8.

Referring to FIGS. 9 and 10, the cutout of the basic electrode of the field generating electrode includes the main branch portion MS forming the first angle θ1 with the vertical reference line forming 90° with the extension direction of the gate line, the center portion CS forming the second angle θ2 with the vertical reference line, and the edge portion ES forming the third angle θ3 with the vertical reference line. The second angle θ2 and the third angle θ3 may be larger than the first angle θ1.

However, the edge portion ES of the cutout of the basic electrode of the field generating electrode of the liquid crystal display according to the present exemplary embodiment has the first edge portion ES1 disposed in the lower portion of the pixel region and the second edge portion ES2 disposed on the upper portion of the pixel region.

The angle θ3*b* formed by the second edge portion ES2 and the vertical reference line is smaller than the angle θ3*a* formed by the first edge portion ES1 and the vertical reference line, and the length of the second edge portion ES2 is smaller than the length of the first edge portion ES1.

Further, the end portion of the second edge portion ES2 is not fully surrounded by the field generating electrode but is instead partially opened so that fluidic disturbance motion can flow out of that opening d1.

An interval d1 between the end portion of the second edge portion ES2 of the cutout of the basic electrode of the field generating electrode of the liquid crystal display according to the exemplary embodiment shown in FIG. 8 and the main branch portion of the adjacent basic electrode is different from intervals d2 and d3 between the end portion of the second edge portion ES2 of the cutout of the basic electrode of the field generating electrode of the liquid crystal display according to the exemplary embodiments shown in FIGS. 9 and 10 and the main branch portion of the adjacent basic electrode.

All characteristics of the liquid crystal display according to the exemplary embodiments described with reference to FIGS. 1 to 6 may be applied to the liquid crystal display according to the present exemplary embodiment.

Figure 11:
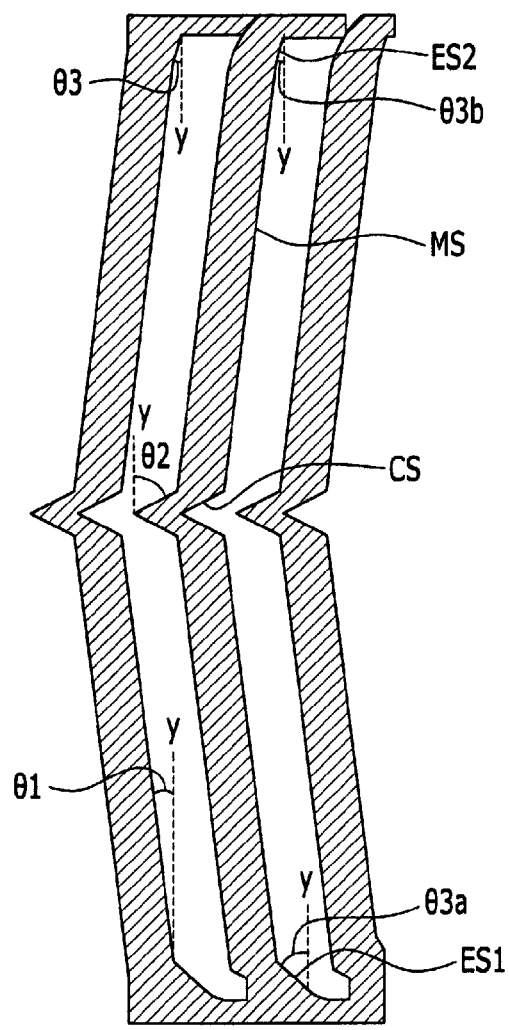

Referring to FIG. 11, the cutout of the basic electrode of the field generating electrode of the liquid crystal display according to the present exemplary embodiment is similar to the cutout of the basic electrode of the field generating electrode of the liquid crystal display according to the exemplary embodiments described with reference to FIGS. 1 to 6.

The cutout of the basic electrode of the field generating electrode includes the main branch portion MS forming the first angle θ1 with the vertical reference line forming 90° with the extension direction of the gate line, the center portion CS forming the second angle θ2 with the vertical reference line, and the edge portion ES forming the third angle θ3 with the vertical reference line. The second angle θ2 and the third angle θ3 may be larger than the first angle θ1.

However, the edge portion ES of the cutout of the basic electrode of the field generating electrode of the liquid crystal display according to the present exemplary embodiment has the first edge portion ES1 disposed in the lower portion of the pixel region and the second edge portion ES2 disposed on the upper portion of the pixel region.

The angle θ3*b* formed by the second edge portion ES2 and the vertical reference line is smaller than the angle θ3*a* formed by the first edge portion ES1 and the vertical reference line, and the length of the second edge portion ES2 is smaller than the length of the first edge portion ES1.

Further, unlike the liquid crystal display according to the exemplary embodiments shown in FIGS. 8 to 10, the end portion of the second edge portion ES2 is essentially fully surrounded by the field generating electrode so that there is basically no opening.

All characteristics of the liquid crystal display according to the exemplary embodiments described with reference to FIGS. 1 to 6 may be applied to the liquid crystal display according to the present exemplary embodiment.

Figure 12:
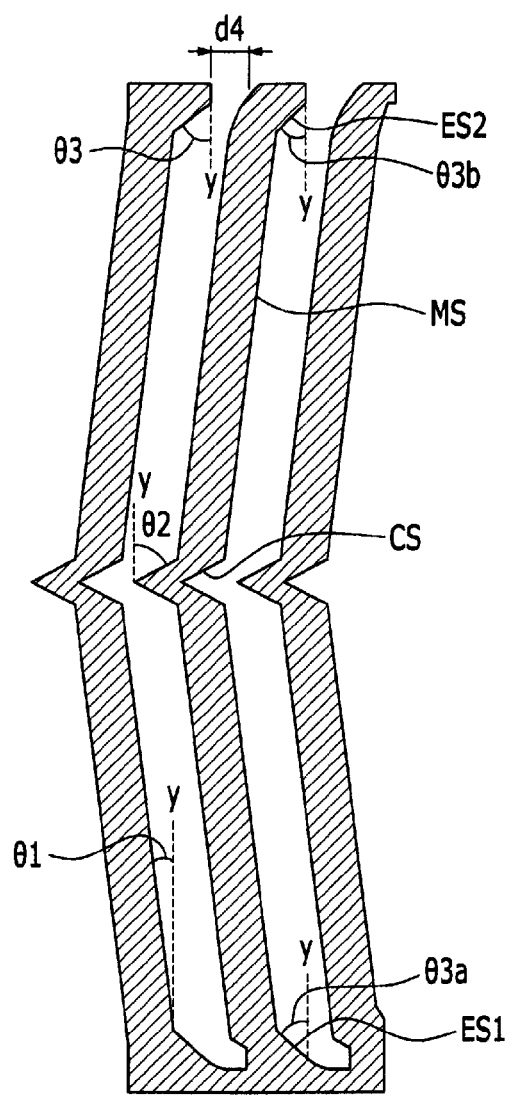

Referring to FIG. 12, the cutout of the basic electrode of the field generating electrode of the liquid crystal display according to the present exemplary embodiment is similar to the cutout of the basic electrode of the field generating electrode of the liquid crystal display according to the exemplary embodiments described with reference to FIGS. 1 to 6.

The cutout of the basic electrode of the field generating electrode includes the main branch portion MS forming the first angle θ1 with the vertical reference line forming 90° with the extension direction of the gate line, the center portion CS forming the second angle θ2 with the vertical reference line, and the edge portion ES forming the third angle θ3 with the vertical reference line. The second angle θ2 and the third angle θ3 may be larger than the first angle θ1.

However, the edge portion ES of the cutout of the basic electrode of the field generating electrode of the liquid crystal display according to the present exemplary embodiment has the first edge portion ES1 disposed in the lower portion of the pixel region and the second edge portion ES2 disposed on the upper portion of the pixel region.

The angle θ3b formed by the second edge portion ES2 and the vertical reference line is larger than the angle θ3a formed by the first edge portion ES1 and the vertical reference line, and the length of the second edge portion ES2 is smaller than the length of the first edge portion ES1.

Further, the end portion of the second edge portion ES2 is not surrounded by the field generating electrode but is opened.

All characteristics of the liquid crystal display according to the exemplary embodiments described with reference to FIGS. 1 to 6 may be applied to the liquid crystal display according to the present exemplary embodiment.

Figure 13:
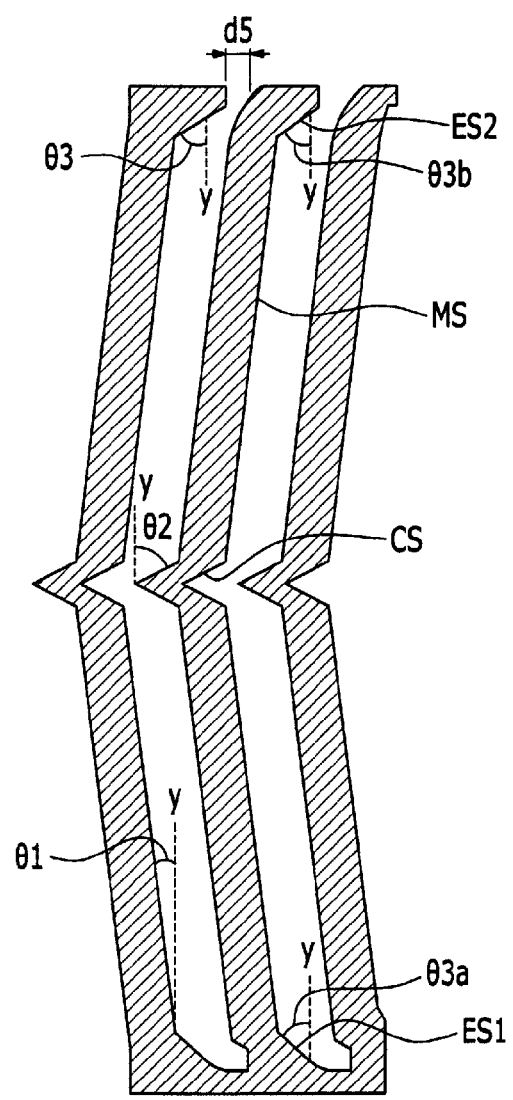
Figure 14:
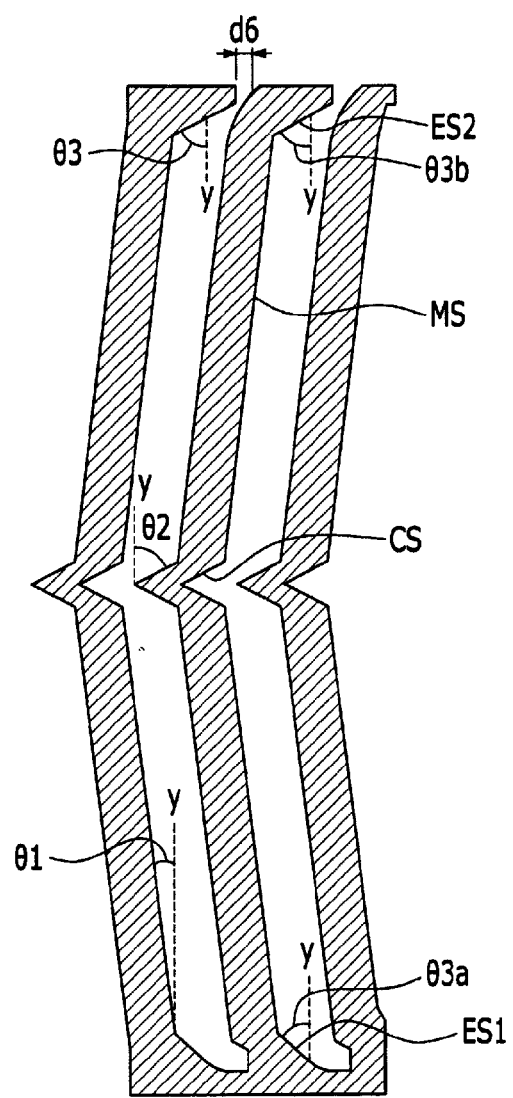

Referring to FIGS. 13 and 14, the cutout of the basic electrode of the field generating electrode of the liquid crystal display according to the present exemplary embodiment is similar to the cutout of the basic electrode of the field generating electrode of the liquid crystal display according to the exemplary embodiment described with reference to FIGS. 1 to 6 and the cutout of the basic electrode of the field generating electrode of the liquid crystal display according to the exemplary embodiment described with reference to FIG. 12.

Referring to FIGS. 13 and 14, the cutout of the basic electrode of the field generating electrode includes the main branch portion MS forming the first angle θ1 with the vertical reference line forming 90° with the extension direction of the gate line, the center portion CS forming the second angle θ2 with the vertical reference line, and the edge portion ES forming the third angle θ3 with the vertical reference line. The second angle θ2 and the third angle θ3 may be larger than the first angle θ1.

However, the edge portion ES of the cutout of the basic electrode of the field generating electrode of the liquid crystal display according to the present exemplary embodiment has the first edge portion ES1 disposed in the lower portion of the pixel region and the second edge portion ES2 disposed on the upper portion of the pixel region.

The angle θ3b formed by the second edge portion ES2 and the vertical reference line is larger than the angle θ3a formed by the first edge portion ES1 and the vertical reference line, and the length of the second edge portion ES2 is smaller than the length of the first edge portion ES1.

Further, the end portion of the second edge portion ES2 is not surrounded by the field generating electrode but is opened.

Further, an interval d4 between the end portion of the second edge portion ES2 of the cutout of the basic electrode of the field generating electrode of the liquid crystal display according to the exemplary embodiment shown in FIG. 12 and the main branch portion of the adjacent basic electrode is different from intervals d5 and d6 between the end portion of the second edge portion ES2 of the cutout of the basic electrode of the field generating electrode of the liquid crystal display according to the exemplary embodiments shown in FIGS. 13 and 14 and the main branch portion of the adjacent basic electrode.

All characteristics of the liquid crystal display according to the exemplary embodiments described with reference to FIGS. 1 to 6 may be applied to the liquid crystal display according to the present exemplary embodiment.

While this disclosure of invention has been described in connection with what is presently considered to be practical exemplary embodiments, it is to be understood that the present teachings are not limited to the disclosed embodiments, but, on the contrary, are intended to cover various modifications and equivalent arrangements included within the spirit and scope of the present teachings.

What is claimed is:

1. A liquid crystal display comprising:
    a first substrate having a major horizontal imaginary reference line (X) and a major vertical imaginary reference line (Y),
    a gate line disposed on the first substrate and extending substantially parallel to the horizontal imaginary reference line (X), and
    a plurality of pixels disposed on the first substrate and each including a first field generating electrode and a second field generating electrode overlapping the first field generating electrode with an insulating layer interposed therebetween,
    wherein one of the first field generating electrode and the second field generating electrode has a plurality of cutouts defined therein,
    wherein each of the cutout comprises two main branch portions (MS), a central section portion (CS), and two end section portions (ES), each main branch portion (MS) provided between the central section portion (CS) and the respective end section portions (ES),
    wherein each main branch portions (MS) forms a corresponding first angle (θ1) with the major vertical imaginary reference line (Y), each central section portion (CS) forms a second angle (θ2) with the major vertical imaginary reference line (Y), the second angle (θ2) being different from the first angle (θ1), each end section portion (ES) forms a third angle (θ3) with the major vertical imaginary reference line (Y), the third angle (θ3) being different from the first angle (θ1), and the first angle (θ1), the second angle (θ2), and the third angle (θ3) are non-zero,
    wherein for each of the cutouts of each of the pixels, a value obtained by multiplying a ratio of a vertical length of the central section portion (CS) to a vertical length of the cutout by a vertical length of each pixel is about 5 μm or less, wherein the vertical length is measured along the major vertical imaginary reference line (Y).

2. The liquid crystal display of claim 1, wherein:
the plurality of pixels are provided at a density of about 200 PPI (pixels per inch) or more.

3. The liquid crystal display of claim 2, wherein:
a horizontal length of the each pixel is about 40 μm or less and the vertical length thereof is about 120 μm or less.

4. The liquid crystal display of claim 3, wherein:
a ratio of a sum of vertical lengths of the two main branch portions (MS) to the vertical length of the cutout is 80% or more but less than 100%,
a ratio of a vertical length of the central section portion (CS) to the vertical length of the cutout is 6% to 13%,
a ratio of a vertical length of a sum of vertical lengths of the two end section portions (ES) to the vertical length of the cutout is 10% or less.

5. The liquid crystal display of claim 3, wherein:
wherein a value obtained by multiplying a sum of a ratio of a vertical length of the central section portion (CS) to the vertical length of the cutout and a ratio of a vertical length of the two end section portions (ES) to the vertical length of the cutout by 10 and then dividing the multiplied value by a PPI (pixels per inch) density value of the plurality of pixels is 1 or less.

6. The liquid crystal display of claim 3, wherein:
the ratio of the vertical length of the two end section portions (ES) to the vertical length of the cutout is about 10% or less.

7. The liquid crystal display of claim 3, wherein:
the second angle (θ2) is larger than the first angle (θ1).

8. The liquid crystal display of claim 7, wherein:
a value obtained by multiplying a sum of the ratio of the vertical length of the central section portion (CS) to the vertical length of the cutout and the ratio of the vertical length of the two end section portions (ES) to the vertical length of the cutout by the vertical length of the pixel is about 20 μm or less.

9. The liquid crystal display of claim 7, wherein:
a value obtained by multiplying the ratio of the vertical length of the central section portion (CS) to the vertical length of the cutout or the ratio of the vertical length of the two end section portions (ES) to the vertical length of the cutout by the vertical length of the pixel is about 5 μm or less.

10. The liquid crystal display of claim 7, wherein:
a horizontal length of each pixel is about 40 μm or less and the vertical length thereof is about 120 μm or less.

11. The liquid crystal display of claim 10, wherein:
the other one of the first and second field generating electrodes has a plate shape with essentially no cutouts.

12. The liquid crystal display of claim 7, wherein:
a ratio of a sum of vertical lengths of the two main branch portions (MS) to the vertical length of the cutout is 80% or more but less than 100%,
a ratio of a vertical length of the central section portion (CS) to the vertical length of the cutout is 6% to 13%,
a ratio of a vertical length of a sum of vertical lengths of the two end section portions (ES) to the vertical length of the cutout is 10% or less.

13. The liquid crystal display of claim 7, wherein:
wherein a value obtained by multiplying a sum of a ratio of a vertical length of the central section portion (CS) to the vertical length of the cutout and a ratio of a vertical length of the two end section portions (ES) to the vertical length of the cutout by 10 and then dividing the multiplied value by a PPI (pixels per inch) density value of the plurality of pixels is 1 or less.

14. The liquid crystal display of claim 7, wherein:
the ratio of the vertical length of the two end section portions (ES) to the vertical length of the cutout is about 10% or less.

15. The liquid crystal display of claim 1, wherein:
the third angle (θ3) is larger than the first angle (θ1).

16. The liquid crystal display of claim 15, wherein:
a value obtained by multiplying a sum of the ratio of the vertical length of the central section portion (CS) to the vertical length of the cutout and the ratio of the vertical length of the two end section portions (ES) to the vertical length of the cutout by the vertical length of the pixel is about 20 μm or less.

17. The liquid crystal display of claim 15, wherein:
a value obtained by multiplying the ratio of the vertical length of the central section portion (CS) to the vertical length of the cutout or the ratio of the vertical length of the two end section portions (ES) to the vertical length of the cutout by the vertical length of the pixel is about 5 μm or less.

18. The liquid crystal display of claim 15, wherein:
a horizontal length of each pixel is about 40 μm or less and the vertical length thereof is about 120 μm or less.

19. The liquid crystal display of claim 18, wherein:
the other one of the first and second field generating electrodes has a plate shape with essentially no cutouts.

20. The liquid crystal display of claim 1, wherein:
the other one of the first and second field generating electrodes has a plate shape with essentially no cutouts for generating corresponding liquid crystal domains.

* * * * *